United States Patent
Westlake et al.

(10) Patent No.: US 6,999,205 B1
(45) Date of Patent: Feb. 14, 2006

(54) IMAGE PROJECTION SYSTEMS

(75) Inventors: Philip Andrew Westlake, Herts (GB); Nigel Ingram Bromley, Bucks (GB); Elaine Kathryn Stedman, Herts (GB)

(73) Assignee: Fujifilm Electronic Imaging Limited, Herts (GB)

( * ) Notice: Subject to any disclaimer, the term of this patent is extended or adjusted under 35 U.S.C. 154(b) by 0 days.

(21) Appl. No.: 09/401,574

(22) Filed: Sep. 22, 1999

(30) Foreign Application Priority Data

Sep. 22, 1998 (EP) .......................................... 98307683

(51) Int. Cl.
*H04N 1/38* (2006.01)

(52) U.S. Cl. ...................... 358/463; 358/531; 348/246; 348/247; 382/190; 382/195; 382/203

(58) Field of Classification Search ................. 358/531, 358/463; 382/190, 195, 203, 149, 151, 217, 382/275, 287, 291; 348/207–273, 335–340, 348/189, 181; 395/117; 356/3.1, 4.06, 309, 356/319, 320, 322, 484, 121, 123, 614, 620, 356/622; 250/208.1
See application file for complete search history.

(56) References Cited

U.S. PATENT DOCUMENTS

| | | | |
|---|---|---|---|
| 4,580,172 A | 4/1986 | Rajagopal ................... 358/293 |
| 4,666,298 A * | 5/1987 | Protz .......................... 356/121 |
| 4,675,533 A | 6/1987 | Shimizu ...................... 250/578 |
| 4,691,365 A | 9/1987 | Nagashima .................. 382/54 |
| 4,827,351 A | 5/1989 | Sakamoto ................... 358/284 |
| 5,015,070 A * | 5/1991 | Montgomery et al. ...... 359/851 |
| 5,214,470 A | 5/1993 | Denber ........................ 355/75 |
| 5,967,982 A * | 10/1999 | Barnett ....................... 600/429 |

* cited by examiner

*Primary Examiner*—Mark Wallerson
*Assistant Examiner*—Heather D. Gibbs
(74) *Attorney, Agent, or Firm*—Sughrue Mion, PLLC (57) ABSTRACT

A method of determining the location of an optical feature in an image projection system, the method comprising:

1) projecting a first image of the feature onto a detector with a lens in a first position;

2) sensing, with the detector, the position of the first image of the feature;

3) projecting a second image of the feature onto a detector with a lens in a second position laterally spaced from the first position;

4) sensing, with the detector, the position of the second image of the feature; and 5) deducing the location of the defect from the difference between the positions sensed in steps 2) and 4).

16 Claims, 9 Drawing Sheets

IMAGE PROJECTION SYSTEMS

FIELD OF THE INVENTION

The present invention relates to a method and apparatus for determining the location of a feature in an image projection system.

DESCRIPTION OF THE PRIOR ART

An image projection system such as an input scanner or camera will conventionally have a number of different optical components (e.g. lenses, light sources, mirrors etc.) which project images onto a detector. Any feature (e.g. a defect) carried by one of these optical components will be imaged onto the detector. In many cases it may be desirable to determine the location of the feature but previously this has not been possible.

SUMMARY OF THE INVENTION

In accordance with a first aspect of the present invention there is provided a method of determining the location of a feature in an image projection system, the method comprising:

1) projecting a first image of the feature onto a detector with a lens in a first position;

2) sensing, with the detector, the position of the first image of the feature;

3) projecting a second image of the feature onto a detector with a lens in a second position laterally spaced from the first position;

4) sensing, with the detector, the position of the second image of the feature; and 5) deducing the location of the feature from the difference between the positions sensed in steps 2) and 4).

The invention effectively measures the parallax of the feature, thus enabling the distance between the feature and the detector to be deduced.

The method can be used to locate any feature but typically the feature comprises an optical component defect—e.g. a scratch or deposit on a lens, mirror, platen or light source.

The positions of the first and second images may be measured in steps 2) and 4) using a single detector element which is scanned over a projection region of the lens. However preferably the or each detector comprises an array of detector elements, and the positions are sensed in steps 2) and 4) in accordance with the position of the image of the feature on the array.

A pair of laterally spaced fixed lenses may be used, each projecting an image of the feature from one of the two positions. However typically the images of the feature are projected in steps 1) and 3) using the same lens, and the method further comprises moving the lens between the first and second positions.

Similarly a pair of laterally spaced detectors may be used, each sensing the position of one of the two images. However typically the images of the feature are projected onto the same detector in steps 1) and 3). In this case, a single fixed array of detector elements may be used with each image being projected onto a different part of the array. However preferably the method further comprises moving the detector between steps 1) and 3).

In a preferred embodiment the lens and detector are moved together between steps 1) and 3). This enables the lens and detector to be housed together in a compact camera unit.

The lens may oscillate between the two positions and the location of the defect may be deduced by sensing the speed of movement of the image of the feature—i.e. if the feature is close to the lens then the image will move quickly. Alternatively the lens may be stationary when it is in the first and second positions.

The absolute positions of the first and second images may be sensed in steps 2) and 4). Alternatively a pair of features may be projected onto the detector, with the relative positions of the corresponding images being sensed. In this case, one of the features may comprise a reference mark on one of the optical components in the image processing system.

In one example the location of the feature is simply output to a user (for instance on a visual display or via a loudspeaker). This enables the user to take any appropriate action.

In accordance with a second aspect of the present invention there is provided a method of generating an electronic representation of an input image, the method comprising a) projecting the input image onto a detector with a projection system whereby the detector generates the electronic representation of the input image;

b) determining the location of a feature in the projection system by a method according to the first aspect of the invention; and c) correcting the electronic representation of the input image in accordance with the location of the feature determined in step b).

The correction step may be carried out "on the fly", i.e. as the electronic representation is being generated in step a). Alternatively the correction may be a post-processing step, performed after the representation has been stored.

The method may be employed in a camera system which generates the electronic representation from a naturally lit scene. However typically the input image is projected onto the detector by illuminating a substrate carrying an original image and directing radiation from the illuminated substrate onto the detector.

Typically the electronic representation of the input image is corrected in step c) by assigning the feature to an optical component in accordance with the location determined in step b); and correcting the electronic representation of the input image signal in accordance with which optical component has been assigned with the feature.

The entire input image may be simultaneously projected onto the detector. However preferably the method further comprises causing relative scanning movement between the detector and the input image. This may be achieved in a number of ways, including moving the detector and/or the lens, or moving the substrate carrying the original image.

In accordance with a third aspect of the present invention there is provided apparatus for determining the location of a feature in an image projection system, the apparatus comprising a detector; one or more lenses for projecting first and second images of the feature onto the detector from laterally spaced positions; means for sensing the positions of the first and second images of the feature; and means for deducing the location of the feature from the difference between the positions of the first and second images.

In accordance with a fourth aspect of the present invention there is provided apparatus for generating an electronic representation of an input image, the apparatus comprising a) a projection system for projecting the input image onto a detector whereby the detector generates the electronic representation of the input image;

b) apparatus according to the third aspect of the present invention for determining the location of a feature in the projection system; and c) means for correcting the electronic representation of the input image in accordance with the location of the feature.

Typically the projection system comprises a radiation source for illuminating a substrate carrying an original image, and means for directing radiation from the illuminated substrate onto the detector.

BRIEF DESCRIPTION OF THE DRAWINGS

A number of embodiments of the present invention will now be described with reference to the accompanying drawings, in which.

DETAILED DESCRIPTION OF THE EMBODIMENTS

Figure 1:
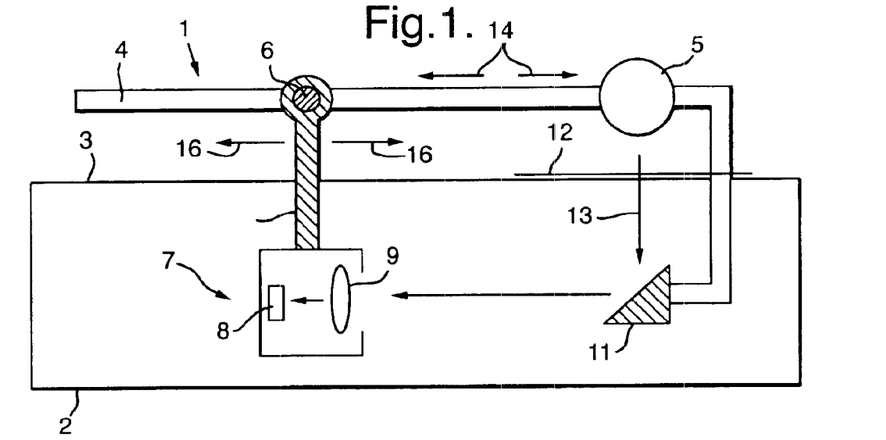
FIG. 1 is a cross-sectional side view of a flatbed scanner.
Figure 2:
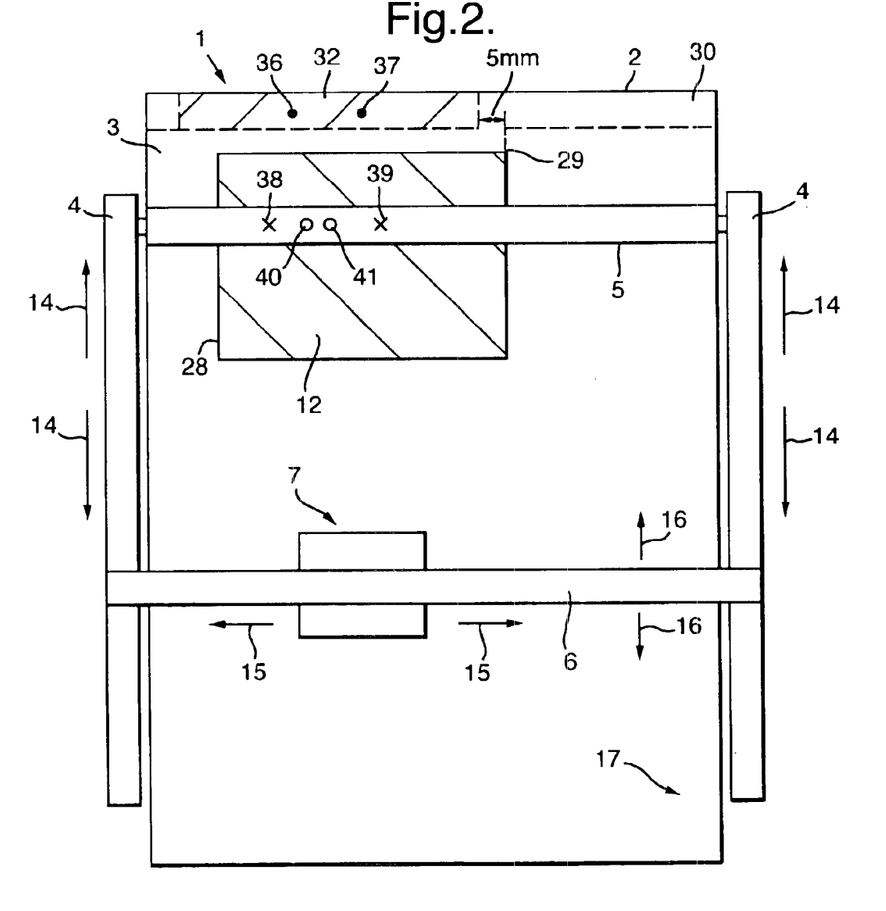
FIG. 2 is a plan view of the flatbed scanner of FIG. 1.

Referring to FIGS. 1 and 2, a flatbed input scanner 1 comprises a housing 2 with a flat transparent upper surface 3 commonly known as a "platen". A movable carriage 4 carries a fluorescent tube 5, a camera support 6 and a mirror 11. A camera 7 comprising a CCD detector array 8 and imaging lens 9 is supported by the camera support 6 by a support arm 10.

A colour transparency 12 to be scanned is placed on the platen 3. The fluorescent tube 5 illuminates a strip extending across the entire platen 3 with a light beam 13 which is reflected by the angled mirror 11 towards the camera 7.

In order to input scan the entire transparency 12, the carriage 4 is moved in the slow scanning direction as indicated at 14. As the tube 5 passes over the transparency 12, the light beam 13 passes through the transparency 12 and is modulated in accordance with the image carried by the transparency. The modulated beam is then reflected towards the camera 7 and an input image (derived from the illuminated strip of the transparency) is focussed onto the detector 8 by the imaging lens 9.

The camera support 6 can be moved in the slow scanning direction as indicated at 16 to change the magnification. When the camera support 6 is at the rear end 17 of the carriage 4, the imaging lens 9 has a field of view extending across the entire platen 3. In addition the CCD camera 7 may be moved in the fast scanning direction as indicated at 15 by sliding the support arm 10 along the camera support 6. This lateral movement enables the camera to view a transparency at high magnification which is not centrally located on the platen 3. In the plan view of FIG. 2 the camera 7 is positioned to image a strip of the platen between the edges of the transparency 12.

Figure 3:
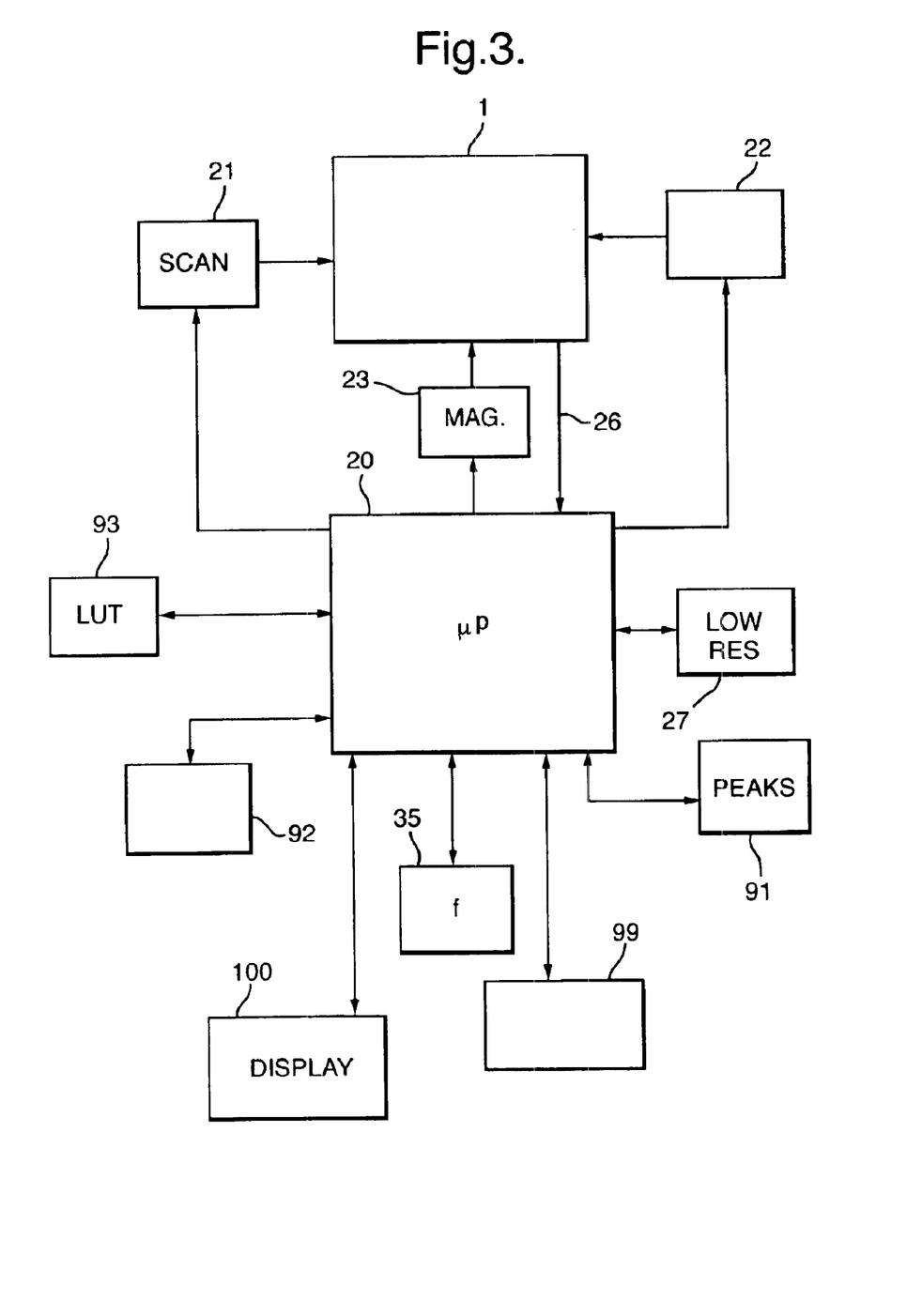
FIG. 3 is a schematic diagram of the processing electronics.

The control system for the input scanner 1 is illustrated in FIG. 3. A microprocessor 20 controls a cross-slide drive motor 21 (which drives the carriage 4), a drive motor 22 (which drives the camera 7 along the support arm 6) and a magnification drive motor 23 (which drives the support arm 6 along the carriage 4 to adjust the magnification).

The detector array 8 comprises a line of 8000 CCD elements, each of which generates a sequence of digital image data values related to the intensity of light received by the element. The image data values are read out from the array as an image signal 26.

Figure 4:
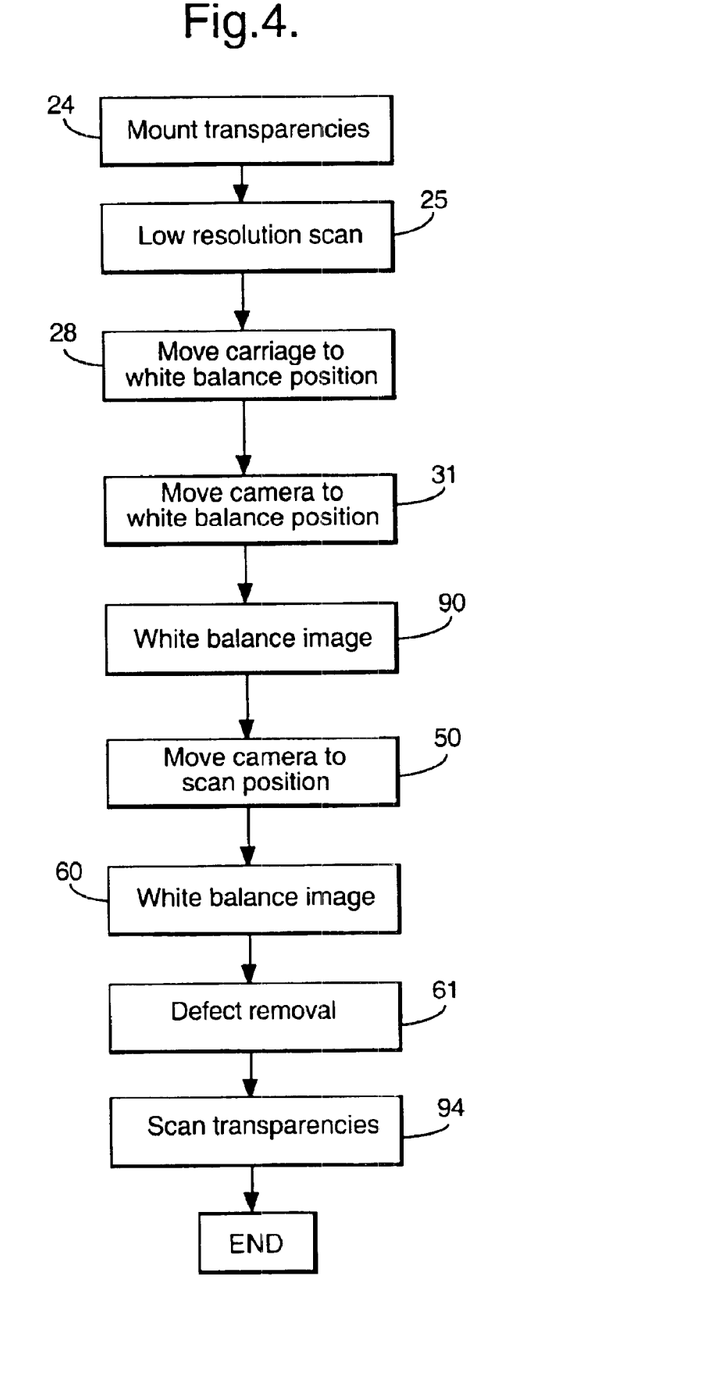
FIG. 4 is a flow diagram illustrating the main process steps in an input scanning procedure.

The imaging procedure is illustrated in the flow chart of FIG. 4. In a first step 24, one or more transparencies are placed on the platen 3 by a user. In the case of FIGS. 1 and 2, only a single transparency 12 is shown, but in general any number of transparencies may be placed on the platen 3.

In step 25, the microprocessor 20 causes the scanner 1 to perform a low resolution scan of the entire platen 3. That is, the camera support 6 is driven to the rear end 17 of the carriage 4 so that the field of view of the detector array 8 extends across the entire platen 3, the carriage 4 is driven along the entire length of the platen 3, and the image signal 26 from the detector 8 is stored in a low resolution image memory 27. The microprocessor 20 then analyses the image in the low resolution memory 27 to locate the coordinates of each of the transparencies on the platen 3. In the case of FIG. 2, the microprocessor 20 determines the coordinates of two opposite corners 28,29 of the transparency 12.

In step 28, the carriage 4 is moved to a white balance position at the end of the platen 3 so that the fluorescent tube 5 illuminates a white balance area 30 in which there are no transparencies. In step 31, the camera 7 is moved to a position appropriate for the first transparency to be scanned (in this case the transparency 12). In addition, the fast scan position of the camera 7 is offset from the centre of the transparency 12 by a distance of say 5mm so that the camera 7 images part of the white balance area indicated at 32 in FIG. 2.

Figure 5:
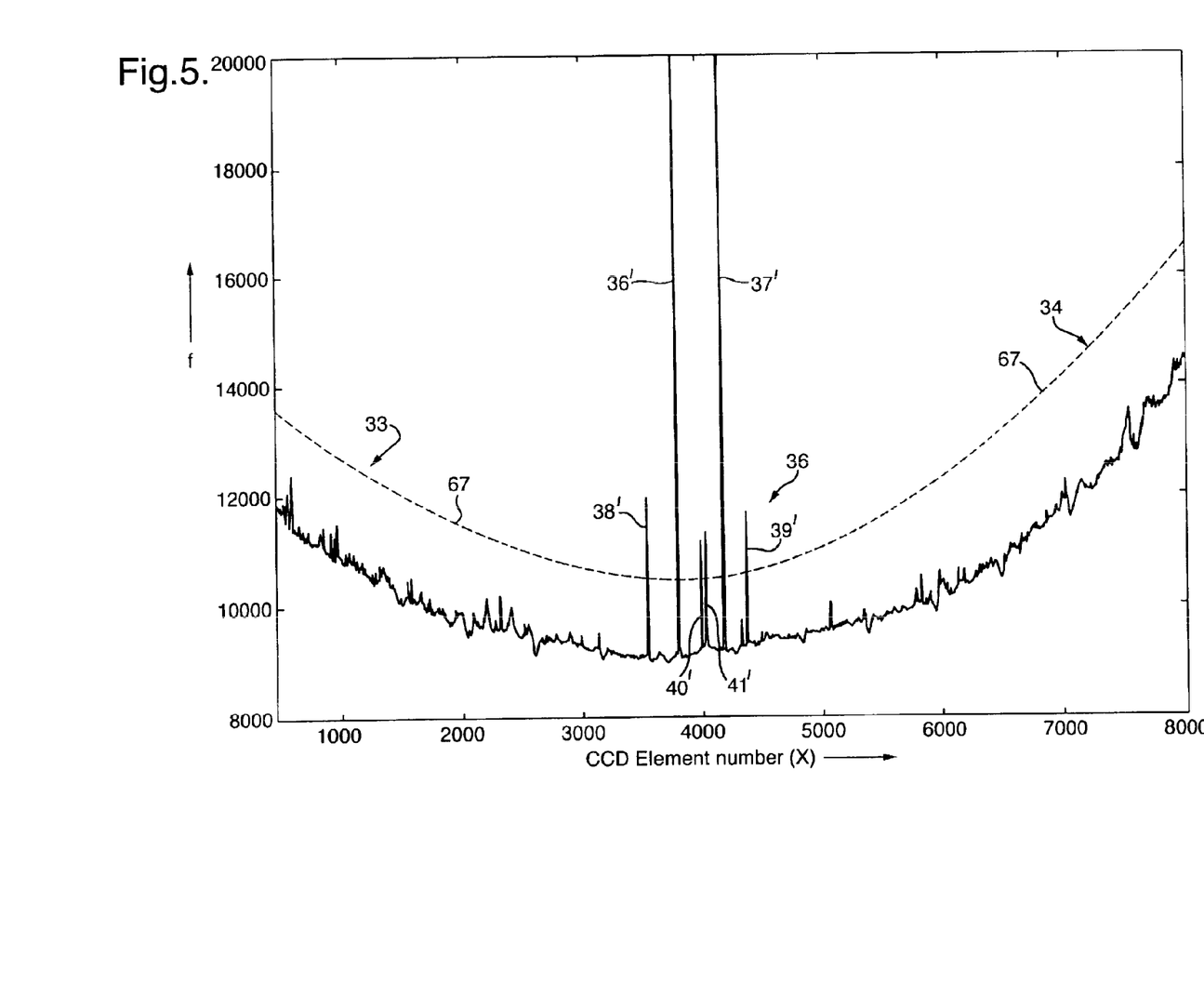
FIG. 5 is a graph illustrating the variation in white balance factor across the detector.

At step 90, the microprocessor performs a first white balance imaging procedure. In the white balance imaging procedure 90, the microprocessor 20 receives a single line of 8000 image data values from the detector 8 and stores the image data values in an image memory 99. The image data values in memory 99 are then processed to generate a white balance factor f for each CCD element. When the image data value is high (corresponding with high light intensity) the factor f is low, and when the image data value is low (corresponding with low light intensity) then the factor f is high. Thus the white balance factor f provides the gain required to bring all signals from the CCD elements to equal values under full illumination. An example of the variation in the factor f across the 8000 element detector array 8 is illustrated in FIG. 5. The horizontal axis of FIG. 5 corresponds with distance across the detector 8, with the CCD elements numbered from 1–8000. The vertical axis of FIG. 5 gives the white balance factor f in arbitrary units. At the left and right hand edges 33,34 of the detector 8 the imaging lens 9 picks up less light, and therefore the factor f is higher. At the centre 36 of the array 8, the imaging lens 9 collects light more efficiently and therefore the factor f is correspondingly lower. The 8000 values of the correction factor f are stored in a white balance memory 35.

A number of defects are present on the optical components illustrated in FIGS. 1 and 2. In particular, the platen 3 carries two defects 36,37, the tube 5 carries two defects 38,39 and the mirror 11 carries two defects 40,41. The defects 36–41 may for instance be scratches, or deposits such as specks of dust, hairs etc. The defects 36–41 cause a reduction in the light reaching the detector 8 which results in peaks in the factor f as shown in FIG. 5. The defects 36,37 on the platen 3 generate sharp high magnitude peaks 36',37'. The peaks 36',37' are sharper and higher than the other peaks because the defects 36,37 on the platen lie on the focal plane of the camera 7. The defects 38,39 in the fluorescent tube 5 generate corresponding peaks 38',39' in the factor f. Similarly, the defects 40,41 in the mirror 11 generate corresponding peaks 40',41' in the correction factor f. The peaks 38'–41' are wider and lower than the peaks 36',37' because the mirror 11 and tube 5 lie off the focal plane of the camera 7.

Returning to FIG. 4, in step 50 the drive motor 22 moves the camera 5 mm to the right to a scan position in line with the transparency 12. In step 60, the microprocessor 20 performs a second white balance imaging procedure in the second scan position (identical to the first white balance imaging procedure 90) to generate a second set of factors f which are stored in memory 35.

Figure 6:
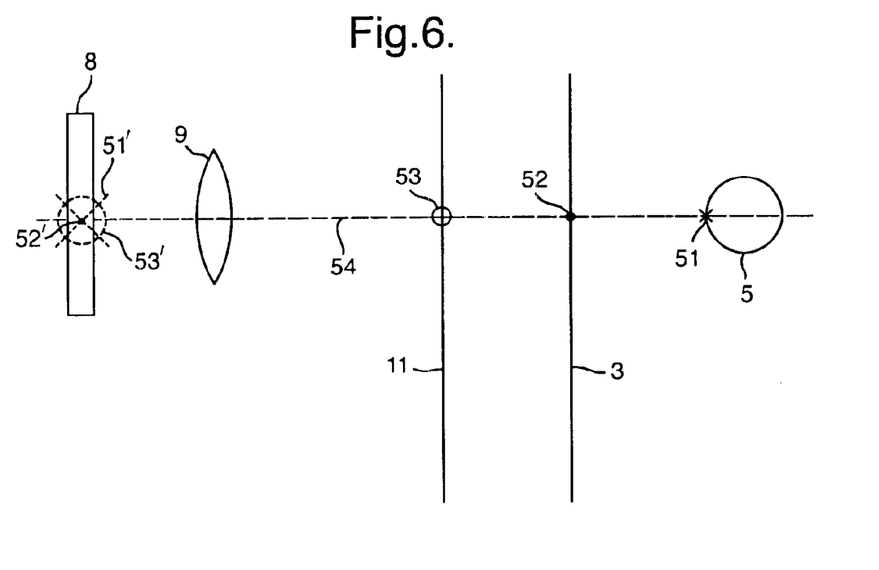
FIG. 6 is a schematic view of three defects being imaged onto the detector from a first position.
Figure 7:
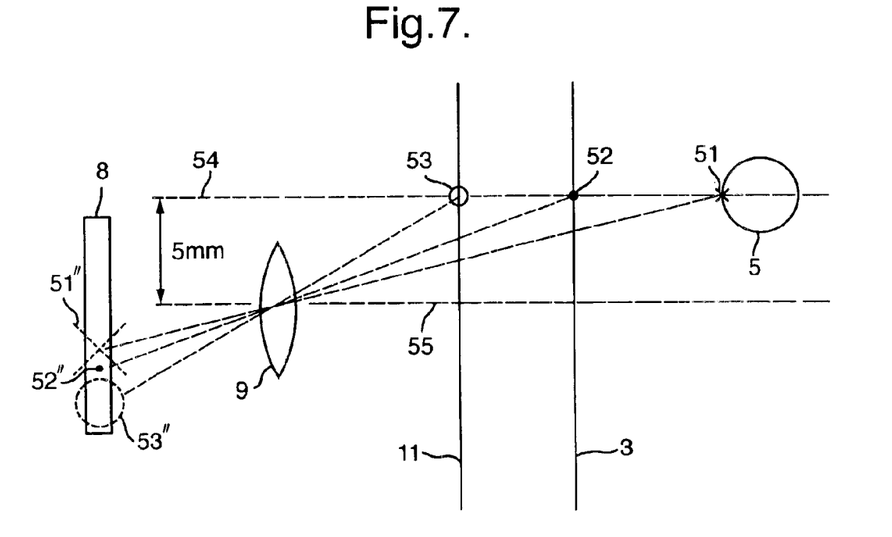
FIG. 7 is a schematic view of the three defects being imaged onto the detector from a second position.

The lateral movement of the camera 7 causes a change in the apparent angular positions of the defects 36–41. This principle is illustrated in FIGS. 6 and 7. Referring to FIG. 6, the three optical elements in the projection system (i.e. the tube 5, platen 3 and mirror 11) each carry a defect 51–53 respectively. The optical axis of the lens 9 (ie. a line normal to the lens passing through its centre) lies on a line 54. For illustrative purposes the defects 51–53 are aligned with the optical axis although in most cases the defects will not be in line. A focussed image 52' of the platen defect 52, and defocussed images 51',53' of the tube defect 51 and mirror defect 53 are all projected onto the same position at the centre of the array 8.

In FIG. 7, the camera 7 has been moved laterally so that the optical axis of the lens 9 lies along a second line 55 spaced laterally from the line 54 by 5 mm. The apparent angular position of the defects 51–53 with respect to the optical axis are now different. As a result, the images 51",52" and 53" of the defects 51–53 are spaced along the detector array 8, and the difference in spacing can be utilized to deduce the location of each of the defects.

Figure 8:
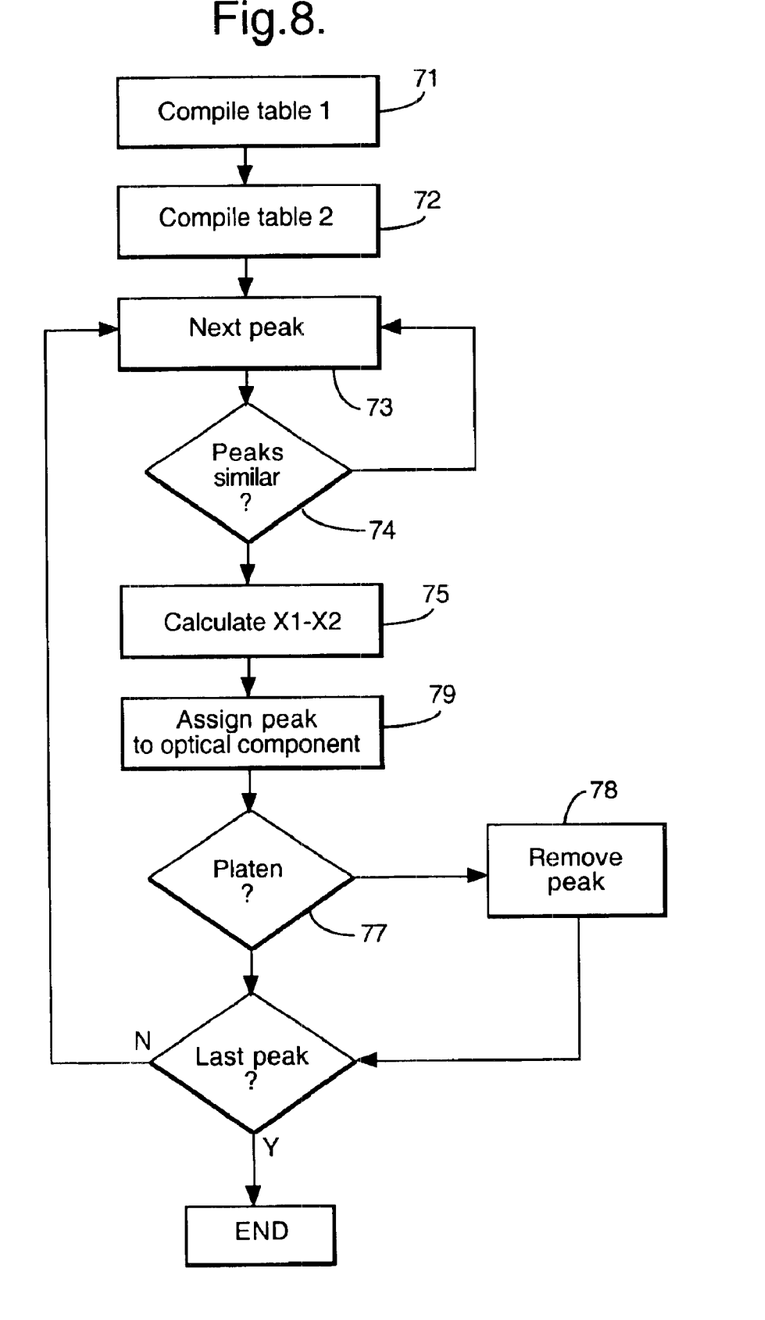
FIG. 8 is a flow diagram illustrating the defect removal procedure.
Figure 9:
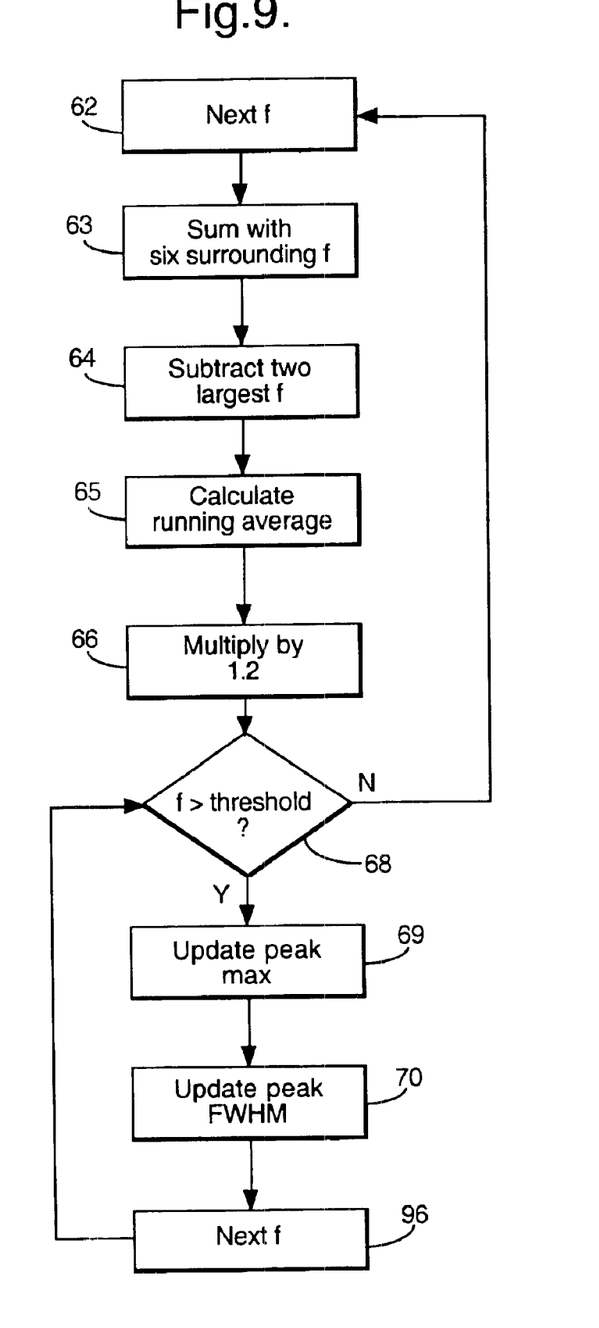
FIG. 9 is a flow diagram illustrating the method of compiling peak tables of defects.

In step 61 (FIG. 4) the microprocessor 20 performs a defect removal procedure, illustrated in more detail in FIGS. 8 and 9. In steps 71 and 72 the microprocessor 20 analyses the two sets of factors f in memory 35 to generate two peak tables. The analysis procedure is illustrated in FIG. 9. In step 62 the microprocessor 20 selects the next factor f. In step 63 the factor f is summed with the six surrounding factors. In step 64, the two largest values in the seven summed values are subtracted from the total. In step 65 the total (after subtraction) is divided by five to generate a running average value. In step 66 the running average value is multiplied by a predetermined factor (eg. 1.2) to give a threshold value. The resulting threshold value is illustrated by dotted line 67 in FIG. 5. In step 68 the microprocessor 20 determines whether the current factor f exceeds the threshold value 67. If the current factor is below the threshold value, then the factor is not part of a peak and the next factor is processed. If the current factor does exceed the threshold value 67, then the current factor is part of a peak. For each peak, a maximum value and full width half maximum (FWHM) value is calculated. The maximum value is updated at 69 and the FWHM value is updated at step 70. The next factor is selected at 96 until the factor falls below the threshold at 68. The final maximum and FWHM values are stored in a peak table in peak memory 91.

The peak table compiled in step 71 is illustrated below in Table 1.

TABLE 1

| PEAK NUMBER | CCD POSITION (X1) | FWHM | MAXIMUM |
|---|---|---|---|
| 1 | 3600 | 20 | 12000 |
| 2 | 3800 | 4 | 20000 |
| 3 | 3990 | 10 | 11500 |
| 4 | 4050 | 11 | 11600 |
| 5 | 4200 | 6 | 20000 |
| 6 | 4400 | 21 | 11900 |

As shown in Table 1, each peak in the correction factor is assigned with a peak number and a CCD position.

The procedure of FIG. 8 is repeated in step 72 for the second position to generate a second peak table as set out below in Table 2.

TABLE 2

| PEAK NUMBER | CCD POSITION (X2) | FWHM | MAXIMUM |
|---|---|---|---|
| 7 | 3500 | 20 | 12050 |
| 8 | 3650 | 4 | 20000 |
| 9 | 3790 | 10 | 11400 |
| 10 | 3850 | 11 | 11500 |
| 11 | 4050 | 6 | 20000 |
| 12 | 4300 | 21 | 11850 |

Referring to FIG. 8, Table 1 and Table 2 are compared to determine the difference in apparent angular position of the defects between the two positions. In step 73 the first peak in Table 2 is selected. In step 74, the microprocessor 20 compares the maximum and FWHM values of the first defect in Table 2 (peak 7) with the first peak in Table 1 (peak 1). If the values are similar then the difference in CCD positions (X1–X2) is calculated and stored in memory 92 in step 75. The contents of the memory 92 is illustrated in Table 3 below.

TABLE 3

| PEAK | X1 – X2 | OPTICAL ELEMENT |
|---|---|---|
| 7 | 100 | Tube |
| 8 | 150 | Platen |
| 9 | 200 | Mirror |
| 10 | 200 | Mirror |
| 11 | 150 | Platen |
| 12 | 100 | Tube |

A look-up table 76 is preloaded with a value for each optical element as illustrated in Table 4 below.

TABLE 4

| OPTICAL ELEMENT | EXPECTED MOVEMENT PER MM AT UNITARY MAG. |
| --- | --- |
| Tube 5 | 20 |
| Mirror 11 | 40 |
| Platen 3 | 30 |

As can be seen in Table 4, with a magnification factor of one, for each mm of movement in the fast scan direction of the camera 7, any defect on the tube 20 will move by twenty CCD elements, any defects on the mirror 11 will move by thirty CCD elements, and any defect on the platen 3 will move by forty CCD elements.

In step 79 the current peak is assigned to one of the optical components with reference to Table 4. The assigned component is entered into the third column in Table 3 above. For instance in the case of peaks 1 and 7, X1–X2 is 100 CCD elements. Since the camera 7 has been moved by 5 mm and the magnification factor is one, then the defect 1 must be on the tube 5.

During a scan of the transparency 12, the defects 38–41 on the mirror 11 and tube 5 (which move with the carriage) must be accounted for. Therefore it is necessary to retain their associated peaks 38'–41' in the white balance factor f. However, the defects 36,37 on the platen in the white balance area 30 will not be present during scanning and therefore their associated peaks 36',37' in the factor f must be removed. The procedure of FIG. 8 enables the platen defects to be identified and removed.

If the defect is on the platen (step 77) then the peak in the factor f stored in memory 35 is removed (step 78) and the intermediate factors are replaced by interpolation. The next peak is then selected at step 73 and processed in a similar way.

Figure 10:
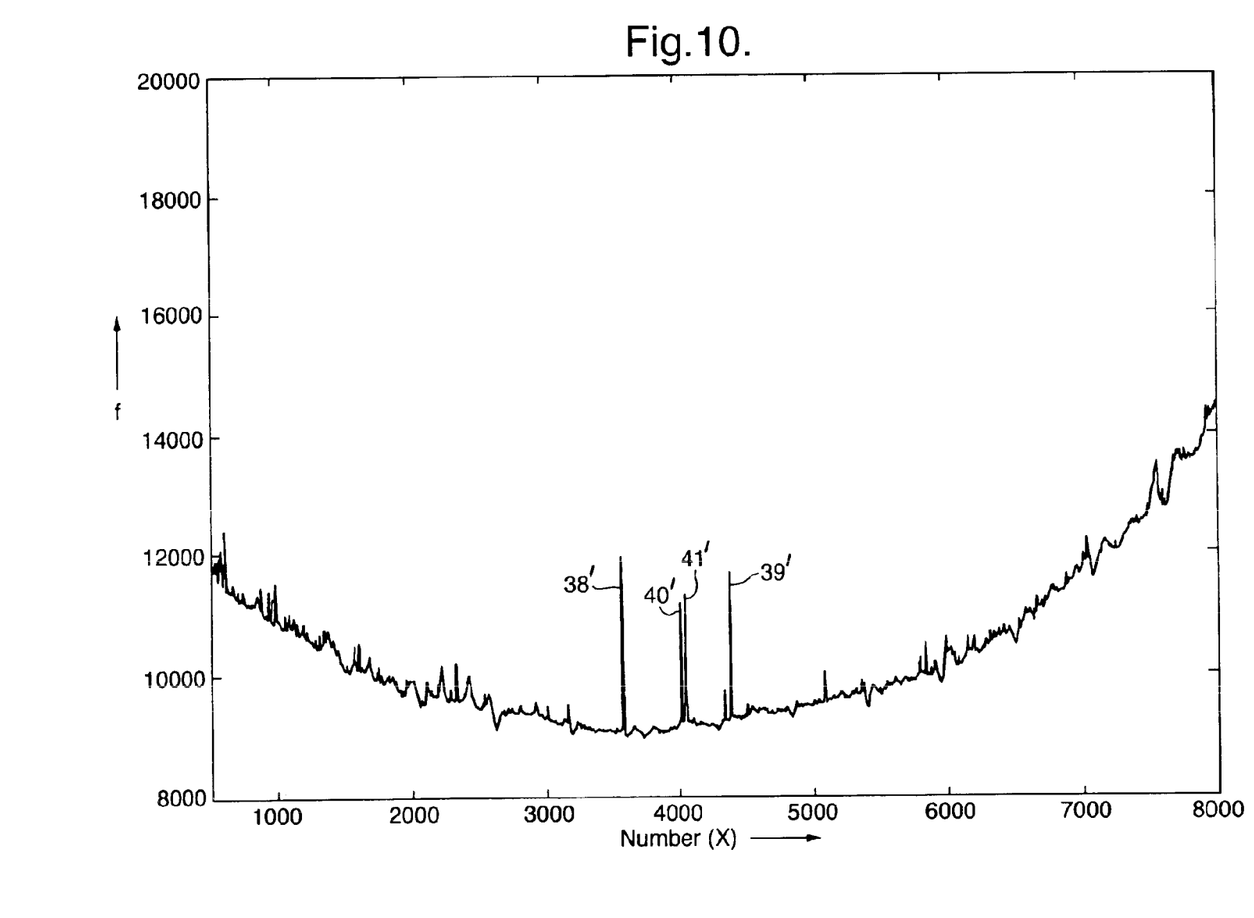
FIG. 10 is a graph illustrating the white balance factor f after peak removal; and, FIG. 11 is a flow diagram illustrating an alternative input scanning procedure.

The white balance factor f (after peak removal) is illustrated in FIG. 10. The peaks 36',37' associated with the platen 3 have been removed and the peaks 38'–41' associated with the mirror 11 and tube 5 have been retained.

Returning to FIG. 4, after the defect removal procedure of step 61, the carriage 4 is driven down the platen 3 to input scan the transparency 12 (step 94). During the input scan 94 the image signal is multiplied by the white balance factor f (after peak removal—FIG. 10) and the corrected image signal is saved in image memory 99.

Figure 11:
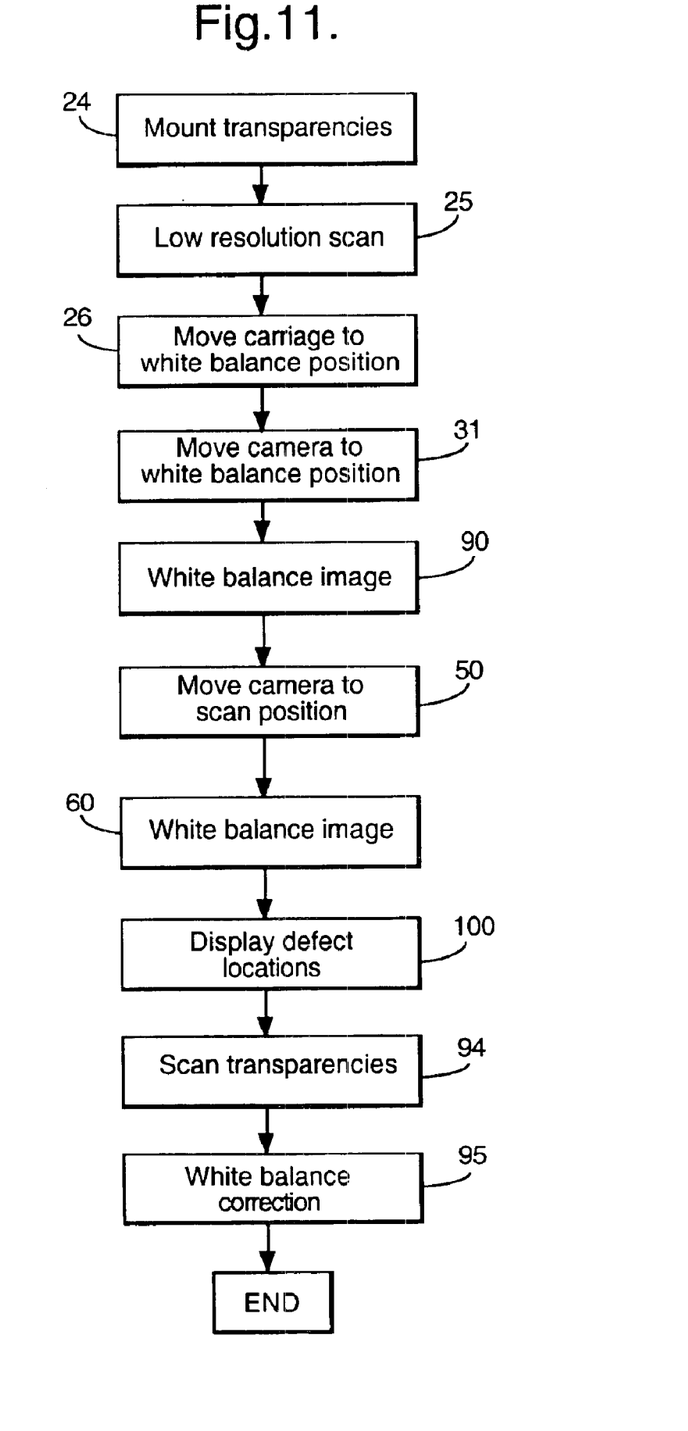

FIG. 11 illustrates an alternative scanning procedure. Most of the steps correspond with FIG. 4 and the same reference numerals have been used as appropriate. However, instead of removing the peaks from the white balance factor f, the, system merely notifies the user of the location of any defects. That is, steps 77 and 78 in FIG. 8 are omitted, and after the peaks have been assigned to their respective optical components in step 76, the microprocessor causes a display 100 to output the message "TWO DEFECTS ON PLATEN, TWO DEFECTS ON WINDOW AND TWO DEFECTS ON TUBE".

The user can then take appropriate action, e.g. cleaning or replacing the tube 5 or mirror 11.

We claim:

1. A method of determining the location of a feature in an image projection system, the method comprising:
   1) projecting a first image of the feature onto detector with a lens in a first position;
   2) sensing, with the detector, the position of the first image of the feature;
   3) projecting a second image of the feature onto a detector with the lens in a second position laterally spaced from the first position;
   4) sensing, with the detector, the position of the second image of the feature; and
   5) deducing the location of the feature from the difference between the positions sensed in steps 2) and 4).

2. A method according to claim 1, wherein the detector comprises an array of detect or elements, and wherein the positions are sensed in steps 2) and 4) in accordance with the position of the image of the feature on the array.

3. A method according to claim 1, wherein the method further comprises moving the lens between the first and second positions.

4. A method according to claim 1, wherein the images of the feature are projected onto the same detector in steps 1) and 3).

5. A method according to claim 4, further comprising moving the detector between steps 1) and 3).

6. A method according to claim 1, further comprising
   6) outputting an indication of the location of the feature in accordance with the deduction in step 5).

7. A method according to claim 1, wherein the feature comprises an optical component defect.

8. A method of generating an electronic representation of an input image, the method comprising
   a) projecting the input image onto a detector with projection system whereby the detector generates the electronic representation of the input image;
   b) determining the location of a feature in the projection system by a method according to claim 1; and
   c) correcting the electronic representation of the input image in accordance with the location of the feature determined in step b).

9. A method according to claim 8, wherein the input image is projected onto the detector by illuminating a substrate carrying an original image and directing radiation from the illuminated substrate onto the detector.

10. A method according to claim 9, wherein the electronic representation of the input image is corrected in step c) by assigning the feature to an optical component in accordance with the location determined in the step b); and correcting the electronic representation of the input image signal in accordance with which optical component has been assigned with the feature.

11. A method according to claim 8, further comprising causing relative scanning movement between the detector and the input image.

12. Apparatus for determining the location of a feature in an image projection system, the apparatus comprising a detector; a lens for projecting a first image of the feature onto the detector the lens being laterally moveable to a second position for projecting a second image of the feature onto a detector; a system for sensing the positions of the first and second images of the feature; and a system for deducing the location of the feature from the difference between the positions of the first and second images.

13. Apparatus for generating an electronic representation of an input image, the apparatus comprising
   a) a projection system for projecting the input image onto a detector whereby the detector generates the electronic representation of the input image;
   b) apparatus according to claim 12 for determining the location of a feature in the projection system; and c) a system for correcting the electronic representation of the input image in accordance with the location of the feature.

14. Apparatus according to claim 13, wherein the projection system comprises a radiation source for illuminating a substrate carrying an original image, and means for directing radiation from the illuminated substrate onto the detector.

15. Apparatus according to claim 13, further comprising a system for generating relative scanning movement between the detector and the input image.

16. Apparatus according to claim 12, wherein the feature comprises an optical component defect.

* * * * *